United States Patent
Wu

(10) Patent No.: US 9,217,396 B2
(45) Date of Patent: Dec. 22, 2015

(54) BOOSTING DEVICES WITH INTEGRAL FEATURES FOR RECIRCULATING EXHAUST GAS

(75) Inventor: Ko-Jen Wu, Troy, MI (US)

(73) Assignee: GM Global Technology Operations LLC, Detroit, MI (US)

(*) Notice: Subject to any disclaimer, the term of this patent is extended or adjusted under 35 U.S.C. 154(b) by 383 days.

(21) Appl. No.: 12/975,983

(22) Filed: Dec. 22, 2010

(65) Prior Publication Data

US 2012/0159950 A1    Jun. 28, 2012

(51) Int. Cl.
| | |
|---|---|
| F02B 33/44 | (2006.01) |
| F02B 47/08 | (2006.01) |
| F01B 25/02 | (2006.01) |
| F02M 25/07 | (2006.01) |
| F02C 6/12 | (2006.01) |
| F01N 3/10 | (2006.01) |
| F02B 29/04 | (2006.01) |
| F02B 37/00 | (2006.01) |

(52) U.S. Cl.
CPC .............. *F02M 25/0712* (2013.01); *F02C 6/12* (2013.01); *F02M 25/0709* (2013.01); *F01N 3/10* (2013.01); *F01N 2340/06* (2013.01); *F02B 29/0406* (2013.01); *F02B 37/00* (2013.01); *F02M 25/0727* (2013.01); *F05D 2270/082* (2013.01); *Y02T 10/121* (2013.01)

(58) Field of Classification Search
CPC .......... F02M 25/0709; F02M 25/0712; F02M 25/0727; F02C 6/12; F01N 3/10; F01N 2340/06; F02B 29/0406; F02B 37/00; F05D 2270/082; Y02T 10/121
USPC ...................... 60/605.2; 123/568.21; 415/116
See application file for complete search history.

(56) References Cited

U.S. PATENT DOCUMENTS

| | | | |
|---|---|---|---|
| 4,250,711 A | | 2/1981 | Zehnder |
| 6,050,095 A | * | 4/2000 | Blake ........................... 60/605.2 |
| 6,145,313 A | * | 11/2000 | Arnold ......................... 60/605.2 |
| 6,263,672 B1 | * | 7/2001 | Roby et al. .................. 60/605.2 |

(Continued)

FOREIGN PATENT DOCUMENTS

| | | |
|---|---|---|
| CN | 101595294 A | 12/2009 |
| DE | 7529221 U | 11/1977 |

(Continued)

OTHER PUBLICATIONS

German Office Action dated Sep. 4, 2012, 6 pgs.

(Continued)

*Primary Examiner* — Kenneth Bomberg
*Assistant Examiner* — Paolo Isada
(74) *Attorney, Agent, or Firm* — Cantor Colburn LLP

(57) ABSTRACT

According to one embodiment of the invention, a turbine housing includes a turbine inlet in fluid communication with a turbine volute configured to house a turbine wheel, the turbine inlet configured to direct an exhaust gas flow from an engine to the turbine wheel. The turbine housing also includes a turbine outlet in fluid communication with the turbine volute, the turbine outlet configured to direct the exhaust gas flow to an exhaust gas conduit and a first exhaust gas recirculation supply port located on and in fluid communication with the turbine outlet, the first exhaust gas recirculation supply port being configured to direct a portion of the exhaust gas flow to an exhaust gas recirculation supply conduit.

11 Claims, 4 Drawing Sheets

(56) References Cited

U.S. PATENT DOCUMENTS

| | | | |
|---|---|---|---|
| 6,360,541 B2* | 3/2002 | Waszkiewicz et al. | 60/605.2 |
| 6,381,960 B1* | 5/2002 | M¶rdberg | 60/602 |
| 6,430,929 B2 | 8/2002 | Martin | |
| 6,494,041 B1* | 12/2002 | Lebold | 60/605.2 |
| 6,601,388 B1* | 8/2003 | Gladden | 60/606 |
| 7,624,575 B2 | 12/2009 | Noelle et al. | |
| 7,721,542 B2* | 5/2010 | Chen | 60/605.2 |
| 2003/0015596 A1 | 1/2003 | Evans | |
| 2005/0188693 A1 | 9/2005 | Schmid et al. | |
| 2007/0144170 A1* | 6/2007 | Griffith | 60/600 |
| 2007/0256411 A1 | 11/2007 | Marsal et al. | |
| 2007/0283698 A1 | 12/2007 | Chen | |
| 2008/0134678 A1 | 6/2008 | Noelle et al. | |
| 2009/0132153 A1 | 5/2009 | Shutty et al. | |
| 2009/0151333 A1 | 6/2009 | Vigild et al. | |
| 2009/0158713 A1 | 6/2009 | Oba | |
| 2009/0277431 A1* | 11/2009 | Nitzke et al. | 123/568.12 |
| 2010/0024414 A1* | 2/2010 | Hittle et al. | 60/602 |
| 2010/0040467 A1 | 2/2010 | Mudel | |
| 2010/0050634 A1 | 3/2010 | Yager | |
| 2010/0122530 A1 | 5/2010 | French | |
| 2010/0132355 A1* | 6/2010 | Michels et al. | 60/605.1 |
| 2011/0048003 A1* | 3/2011 | Chen | 60/605.2 |
| 2011/0067680 A1* | 3/2011 | Williams et al. | 123/568.21 |
| 2011/0088393 A1* | 4/2011 | Romblom et al. | 60/605.2 |
| 2012/0017879 A1* | 1/2012 | Wu | 123/568.11 |
| 2012/0067330 A1* | 3/2012 | Wu | 123/540 |
| 2012/0067332 A1* | 3/2012 | Wu | 123/568.12 |
| 2012/0159949 A1* | 6/2012 | Wu | 60/605.2 |
| 2012/0159950 A1 | 6/2012 | Wu | |

FOREIGN PATENT DOCUMENTS

| | | |
|---|---|---|
| DE | 19756060 C1 | 12/1998 |
| DE | 10303776 A1 | 8/2004 |
| DE | 112006003468 T5 | 11/2008 |
| DE | 102008052088 A1 | 4/2010 |
| EP | 1867865 A2 | 12/2007 |
| EP | 2261481 A1 | 12/2010 |
| JP | 04112957 * | 4/1992 |
| JP | 2007154675 A | 6/2007 |
| JP | 2008309125 A * | 12/2008 |
| WO | 2009068181 A1 | 6/2009 |

OTHER PUBLICATIONS

David Roth, Rong Zhang, Rolf Sauerstein, Michael Becker, "New Aspects of Application of Hybrid EGR Systems to Turbocharged GDI Engines" BorgWarner Engine Sytems Group, Aachener Kolloquium Fahrzeug- und Motorentechnik 2009, pp. 1-24.

John E. Dec, Wontae Hwang, Yi Yang, HCCI and Stratified-Charge CI Engine Combustion Research, U.S. Doe, Office of Vehicle Technoligies Annual Merit Review and Peer Evaluation, Sandia National Laboratories, May 19, 2009, pp. 1-18.

Kukwon Cho, Manbae Han, Robert M. Wagner and C. Scott Sluder; Oak Ridge National Laboratory; "Mixed-source EGR for Enableing High Efficiency Clean Combustion Modes in a Light-Duty Diesel Engine" SAE International 2008 World Congress Detroit, Michigan Apr. 14-17, 2008; reprinted from In-Cylinder Diesel Particulate & NOx Control, 2008 (SP-2168), 11 pgs.

Oldrich Vitek, Jan Macek and Milos Polasek, Czech Tehcnincal University in Prague Josef Bozek Research Center, Stefan Schmerbeck, Volkswagen AG, Thomas Kammerdiener, AVL Graz, AVL Fuel Systems "Comparison of Different EGR Solutions", SAE International 2008 World Congress Detroit, Michigan Apr. 14-17, 2008; Reprinted from: Modeling of SI & Diesel Engines, 2008 (SP-2156), 20 pgs.

Robert Czarnowski, Voker Joerrgl, Oaf Weber, John Shutty, Phil Keller; BorgWarner, Inc.; "Can Future Emmisions Limites be Met with a Hybrid EGR System Alone?" 2008 Diesel Engine-Efficiency and Emissions Research (DEER) Conference, Aug. 4-7, 2008, Deerborn, Michigan, pp. 1-20.

Ming Zheng, Graham Reader, Gary Hawley; "Diesel Engine Exhaust Gas Recirclulation—A Review on Advanced and Novel Concepts"; Apr. 2004; Energy Conversion and Management; vol. 45; Issue 6; pp. 883-900.

German Office Action for Application No. 102011121276.4 dated Mar. 20, 2013; 7 pages.

German Office Action for Application No. 102011121465.1 dated Mar. 14, 2013; 11 pages.

Japanese Office Action for Application No. 201110435096.0 dated Jan. 19, 2014, 7 pages.

David Roth, Rong Zhang, Rolf Sauerstein, Michael Becker, "New Aspects of Application of Hybrid EGR Systems to Turbocharged GDI Engines"; BorgWarner Engine Systems Group; Aachener Kolloquium Fahrzeug- und Motorentechnik; 2009; pp. 1-24.

Robert Czarnowski, Voker Joerrgl, Oaf Weber, John Shutty, Phil Keller; BorgWarner, Inc.; "Can Future Emmisions Limits be Met with a Hybrid EGR System Alone?"; 2008 Diesel Engine-Efficiency and Emissions Research (DEER) Conference; Aug. 4-7, 2008; Deerborn, Michigan; pp. 1-20.

Oldrich Vitek, Jan Macek and Milos Polasek, Czech Technincal University in Prague Josef Bozek Research Center; Stefan Schmerbeck, Volkswagen AG, Thomas Kammerdiener, AVL Graz, AVL Fuel Systems "Comparison of Different EGR Solutions"; SAE International 2008 World Congress Detroit, Michigan; Apr. 14-17, 2008; reprinted from Modeling of SI & Diesel Engines; 2008 (SP-2156); 20 pages.

Kukwon Cho, Manbae Han, Robert M. Wagner and C. Scott Sluder; Oak Ridge National Laboratory; "Mixed-source EGR for Enableing High Efficiency Clean Combustion Modes in a Light-Duty Diesel Engine" SAE International 2008 World Congress Detroit, Michigan Apr. 14-17, 2008; reprinted from In-Cylinder Diesel Particulate & NOx Control, 2008 (SP-2168); 11 pages.

* cited by examiner

BOOSTING DEVICES WITH INTEGRAL FEATURES FOR RECIRCULATING EXHAUST GAS

FEDERAL RESEARCH STATEMENT

This invention was made with Government support under Agreement No. DE-FC26-07NT43271, awarded by the Department of Energy. The U.S. Government has certain rights in the invention.

FIELD OF THE INVENTION

Exemplary embodiments of the present invention are related to turbochargers, and air induction systems, and, more particularly, to a turbocharger housing having an integral exhaust gas recirculation (EGR) conduit.

BACKGROUND

The efficient use of exhaust gas recirculation (EGR) is important to all modern internal combustion engines, including both gasoline and diesel engines. Efficient use of EGR generally supports the objectives of realizing high power output from these engines while also achieving high fuel efficiency and economy and achieving increasingly stringent engine emission requirements. The use of forced-induction, particularly including turbochargers, in these engines is frequently employed to increase the engine intake mass airflow and the power output of the engine. However, turbochargers are also powered by exhaust gas, so the efficient use of EGR and turbocharged forced-induction necessitates synergistic design of these systems.

It is desirable to have turbocharged engines efficiently use the energy available in the exhaust system in order to improve overall engine efficiency and fuel economy. Further, as engines become more complex, packaging of various components can make design of the turbocharger challenging. For example, as emissions regulations become more stringent, a closely coupled catalytic converter may be mounted directly to the turbocharger exhaust outlet. This may impact the positioning of EGR system components, such as exhaust gas supply and receiving ports. Accordingly, improved packaging of the turbocharger, air induction system, exhaust system and EGR system will enable use of turbochargers and EGR systems in a variety of applications, thereby leading to improved efficiency and performance.

SUMMARY OF THE INVENTION

According to one embodiment of the invention, a turbine housing includes a turbine inlet in fluid communication with a turbine volute configured to house a turbine wheel, the turbine inlet configured to direct an exhaust gas flow from an engine to the turbine wheel. The turbine housing also includes a turbine outlet in fluid communication with the turbine volute, the turbine outlet configured to direct the exhaust gas flow to an exhaust gas conduit and a first exhaust gas recirculation supply port located on and in fluid communication with the turbine outlet, the first exhaust gas recirculation supply port being configured to direct a portion of the exhaust gas flow to an exhaust gas recirculation supply conduit.

According to another embodiment, a turbocharger includes a turbine, where the turbine includes a turbine wheel attached to a shaft, the turbine wheel rotatably disposed in a turbine housing. The turbine also includes a turbine inlet located on the turbine housing and in fluid communication with a turbine volute that houses the turbine wheel, the turbine inlet configured to direct a first exhaust gas flow from an engine to the turbine wheel and a turbine outlet located on the turbine housing, the turbine outlet in fluid communication with the turbine volute. In addition, the turbine includes an exhaust gas recirculation supply port located on and in fluid communication with the turbine outlet, the exhaust gas recirculation supply port being configured to direct a portion of the first exhaust gas flow to an exhaust gas recirculation supply conduit.

The above features and advantages, and other features and advantages of the invention are readily apparent from the following detailed description of the invention when taken in connection with the accompanying drawings.

BRIEF DESCRIPTION OF THE DRAWINGS

Other objects, features, advantages and details appear, by way of example only, in the following detailed description of the embodiments, the detailed description referring to the drawings in which.

DETAILED DESCRIPTION OF THE EMBODIMENTS

Figure 1:
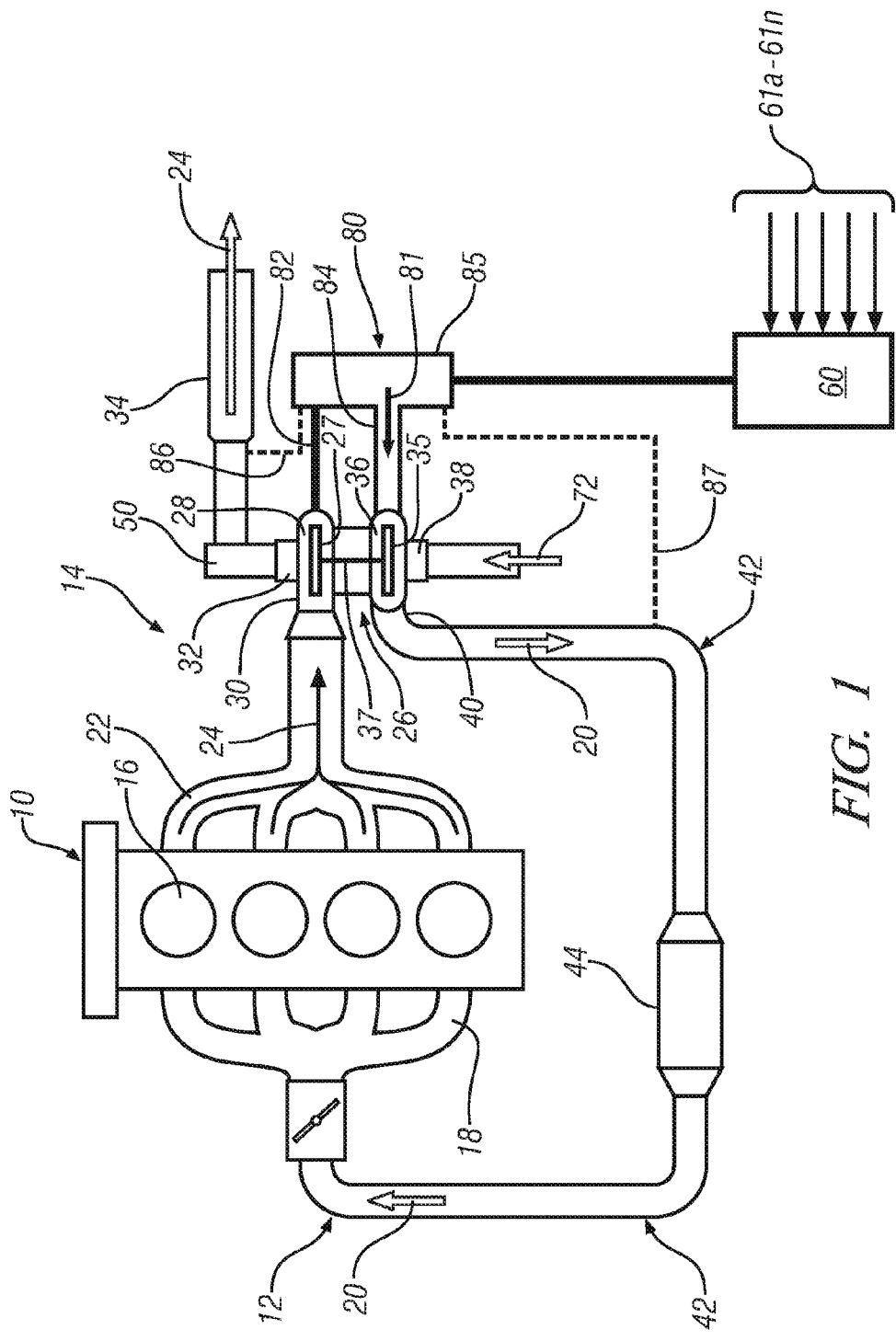
FIG. 1 is a schematic diagram of an embodiment of an internal combustion engine.

The following description is merely exemplary in nature and is not intended to limit the present disclosure, application or uses. It should be understood that throughout the drawings, corresponding reference numerals indicate like or corresponding parts and features.

Referring to FIG. 1, an exemplary embodiment of an internal combustion engine 10 is illustrated, in this case an in-line four cylinder engine, including an intake system 12 and an exhaust system 14. The internal combustion engine includes a plurality of cylinders 16 into which a combination of combustion air and fuel are introduced. The combustion air/fuel mixture is combusted resulting in reciprocation of pistons (not shown) therein. The reciprocation of the pistons rotates a crankshaft (not shown) to deliver motive power to a vehicle powertrain (not shown) or to a generator or other stationary recipient of such power (not shown) in the case of a stationary application of the internal combustion engine 10.

The internal combustion engine 10 includes an intake manifold 18 in fluid communication with the cylinders 16 that receives a compressed intake charge from a compressor in the intake system 12 and delivers the charge to the plurality of cylinders 16. The exhaust system 14 includes an exhaust manifold 22, also in fluid communication with the cylinders 16, which is configured to remove combusted constituents of the combustion air and fuel (i.e. exhaust gas 24) and to deliver it to an exhaust driven turbocharger 26 that is located in fluid communication therewith. The exhaust driven turbocharger 26 includes an exhaust gas turbine wheel 27 that is housed within a turbine housing 28. The turbine housing includes an inlet 30 and an outlet 32. The outlet 32 is in fluid communication with the remainder of the exhaust system 14 and delivers the exhaust gas 24 to an exhaust gas conduit 34. The exhaust gas conduit 34 may include various exhaust after treatment devices, such as catalytic converter 50. As depicted, the catalytic converter 50 is close coupled to the outlet 32 of the turbocharger 26 and is configured to treat various regulated constituents of the exhaust gas 24 prior to its release to the atmosphere.

The exhaust driven turbocharger 26 also includes an intake charge compressor wheel 35 that is housed within a compressor housing 36. The compressor wheel 35 is coupled by a shaft 37 to turbine wheel 27. The compressor housing 36 includes an inlet 38 and an outlet 40. The outlet 40 is in fluid communication with the intake system 12 and delivers a compressed intake charge 20 through an intake charge conduit 42 to the intake manifold 18 for delivery to the cylinders 16 of the internal combustion engine 10 for mixing with fuel and for combustion therein. In an exemplary embodiment, disposed inline, between the compressor housing outlet 40 and the intake manifold 18, is a compressed intake charge cooler 44. The compressed intake charge cooler 44 receives heated (due to compression) compressed intake charge 20 from the intake charge conduit 42 and, following cooling of the compressed intake charge 20 therein, delivers it to the intake manifold 18 through a subsequent portion of the intake charge conduit 42.

Located in fluid communication with the exhaust system 14, and in the exemplary embodiment shown in FIG. 1, is an exhaust gas recirculation ("EGR") system 80. The EGR system 80 includes EGR supply conduit 82, EGR inlet conduit 84, and EGR valve 85. In one embodiment, the EGR supply conduit 82 is in fluid communication with and coupled to turbine housing 28. In addition, the EGR inlet conduit 84 is in fluid communication with and coupled to compressor housing 36. The EGR supply conduit 82 is configured to divert a portion of the exhaust gas 24 from the turbine housing 28 and to direct it to, or recirculate it to, the intake system 12 through the compressor housing 36 of the exhaust driven turbocharger 26. As depicted, the EGR valve 85 is in signal communication with a control module such as engine controller 60. The EGR valve 85 adjusts the volumetric quantity of received exhaust gas 24 that is diverted, as recirculated exhaust gas 81, to the intake system 12, based on the particular engine operating conditions at any given time. The engine controller 60 collects information regarding the operation of the internal combustion engine 10 from sensors 61a-61n, such as temperature (intake system, exhaust system, engine coolant, ambient, etc.), pressure, exhaust system conditions, driver demand and, as a result, may adjust the flow of exhaust gas 24 through the EGR valve 85 to be mixed with fresh air 72 to form the compressed intake charge 20. As used herein, the term controller refers to an application specific integrated circuit (ASIC), an electronic circuit, a processor (shared, dedicated or group) and memory that executes one or more software of firmware programs, a combinational logic circuit, and/or other suitable components that provide the described functionality. As a result, the compressed intake charge 20 may comprise a continuously variable combination of fresh air 72 and exhaust gas 24, depending on the commanded quantity of EGR by the controller 60. In another embodiment, an exhaust gas supply 86 may be diverted from exhaust conduit 34, either upstream or downstream of catalytic converter 50 to the EGR valve 85. In yet another embodiment, an EGR inlet 87 is in fluid communication with intake charge conduit 42, thereby directing the exhaust gas to be mixed with the air intake charge 20 downstream of the turbocharger 26. In embodiments, the EGR system 80 also includes an EGR cooler, wherein the EGR cooler is configured to cool the EGR exhaust received by the turbocharger 26 or intake charge supply conduit 42.

In an exemplary embodiment, the EGR supply conduit 82 is coupled to the turbine housing 28 via a supply port near the exhaust outlet 32. The exhaust flow 24 passes through the turbine wheel 27 located in the turbine housing 28. The EGR supply conduit 82 receives a portion of exhaust flow 24 from the chamber directed through exhaust outlet portion 32, prior to treatment of the exhaust flow 24 by catalytic converter 50. Exemplary embodiments of the turbocharger 26 and EGR system 80, as well as various arrangements thereof are described in detail below with reference to FIGS. 2-4.

Figure 2:
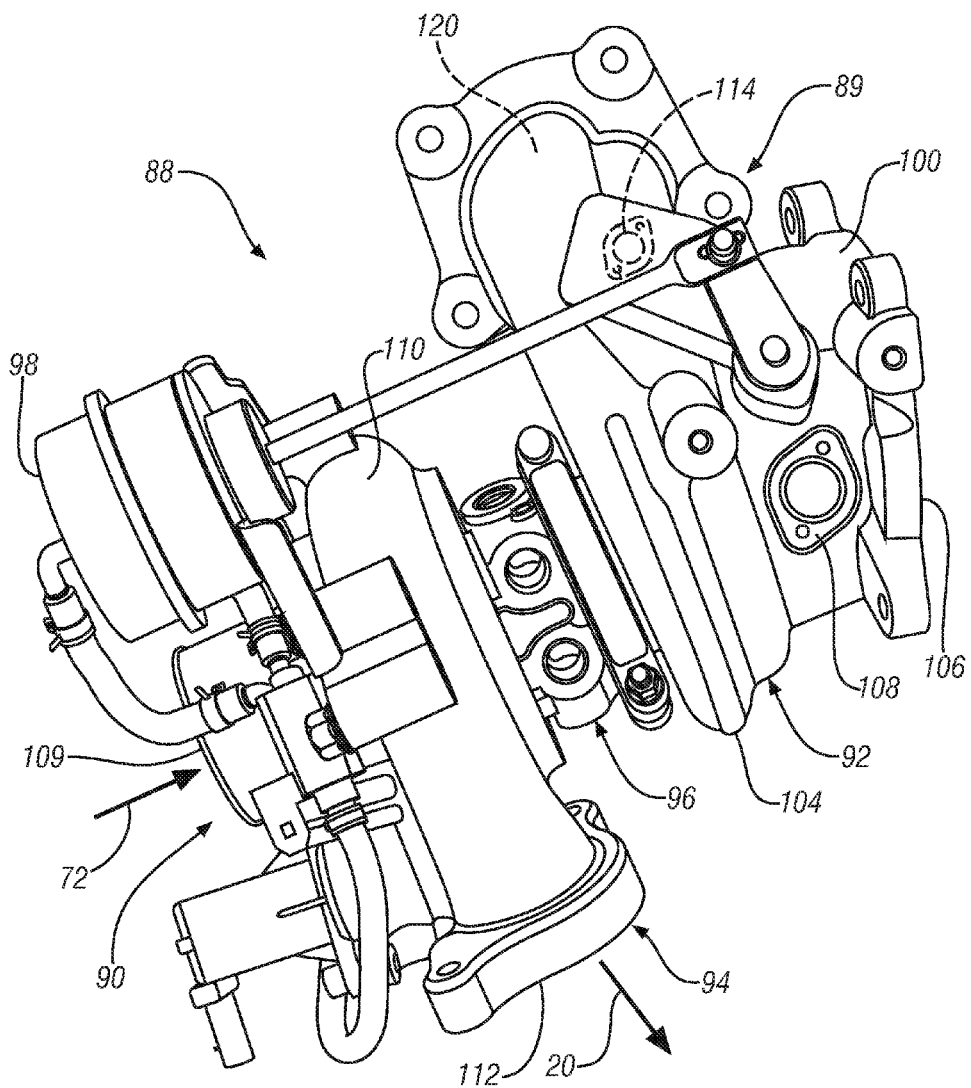
FIG. 2. is a perspective view of an embodiment of a turbocharger.

Referring now to FIGS. 1 and 2, in one embodiment, an exemplary turbocharger 88 includes turbine portion 89 and compressor portion 90. The turbine portion 89 includes a turbine housing 92 and compressor portion 90 includes compressor housing 94. The turbine housing 92 and compressor housing 94 are coupled by shaft housing 96. The turbocharger 88 also includes a wastegate controller 98 configured to control a selected flow of exhaust through a wastegate passage 100. The turbine housing 92 includes an exhaust inlet 102 configured to receive exhaust flow 24, FIG. 1, from the exhaust manifold 22. The exhaust gas flow 24 drives rotation of the turbine wheel 27, located in turbine volute 104 of turbine housing 92. The turbine housing 92 also includes an exhaust outlet 106 which directs exhaust gas flow 24 from the turbine volute 104 to catalytic converter 50. An EGR supply port 108 is on, and in fluid communication with, exhaust outlet 106. The EGR supply port 108 is configured to direct a portion of exhaust gas 24 from the turbine volute 104 to EGR supply conduit 82. The EGR supply conduit 82 directs the exhaust gas 24 to EGR valve 85, wherein a selected amount of the exhaust gas flow 24 is directed to air intake manifold 18 via suitable conduits or plumbing, such as EGR inlet conduit 84 and compressor volute 110, which direct the exhaust gas flow 24 to intake charge conduit 42.

The turbine wheel 27 within turbine housing 92 is coupled by shaft 37 (FIG. 1) within shaft housing 96 to compressor wheel 35 in compressor housing 94. The shaft housing 96 also includes bearings (not shown) to enable rotation of the shaft 37. The compressor housing 94 includes air inlet 109, compressor volute 110, and compressed air outlet 112. The air inlet 109 receives fresh air 72 and directs the air to the compressor wheel 35 within compressor volute 110. The compressed air is directed from the compressor volute 110 to the compressed air outlet 112, where the air intake charge 20 is then routed to the engine 10 by intake system 12. In an exemplary embodiment, an EGR supply port 114 is in fluid communication with and on wastegate passage 100 where a portion of the exhaust gas flow 24 that is directed through the passage 100 may be directed through EGR system 80 to be mixed with a fresh air intake 72. The exhaust gas flow through EGR supply port 114 is located upstream of the turbine wheel and is therefore at a higher pressure relative to gas flow downstream of the turbine wheel. In an exemplary embodiment, the EGR supply port 114 may be used instead of, or in combination with, EGR supply port 108. The turbine housing 92 and EGR supply ports 108 and 114 may be produced by any suitable method, such as machining the parts, casting as a single part or by casting a plurality of parts and coupling them via welds or fasteners. The parts may be formed from any suitable, durable material, such as cast iron, stainless steel or a steel alloy. As discussed herein, the non-limiting examples of the turbocharger depicted in FIGS. 2-4 may include substantially similar components, although each component may not be shown in each figure, wherein the illustrated embodiments are used to describe particular portions of the turbocharger, and/or EGR system configurations.

Therefore, the EGR supply conduit 82 and EGR supply ports 108 and 114 provide improved packaging for increasingly complex engines by providing EGR integration with turbocharger 88. In addition, the configuration provides flexibility for a variety of engines and applications. By integrating the EGR supply ports 108 and 114 with the turbine housing 92, the embodiments provide a simplified system to reduce costs and reduce production times. Moreover, the embodiments provide improved engine efficiency by enabling a supply of exhaust gas 24 from the turbocharger 88 upstream of closely coupled catalytic converter 50.

Figure 3:
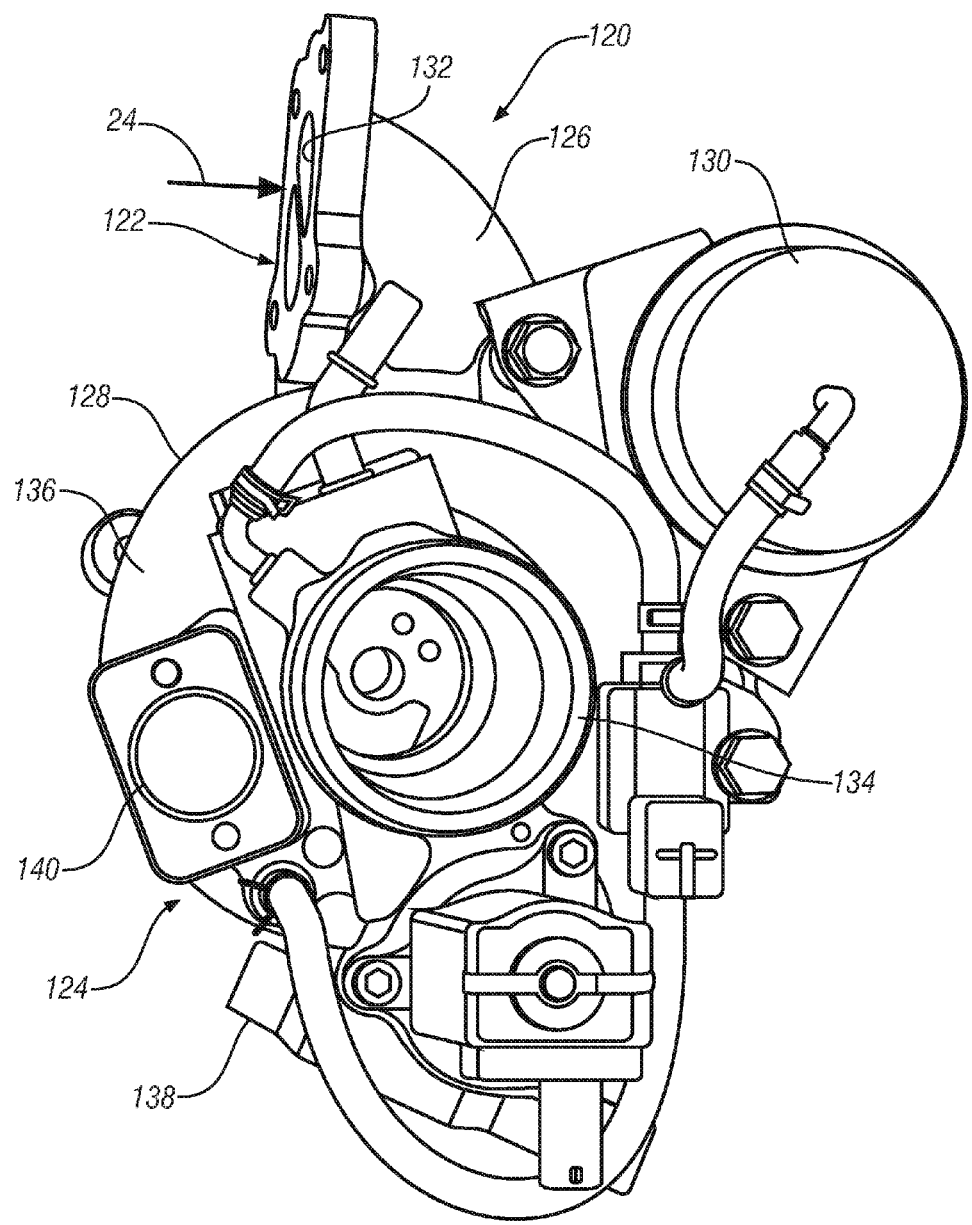
FIG. 3 is a perspective view of another embodiment of a turbocharger.

Referring now to FIGS. 1 and 3, in an exemplary embodiment, a turbocharger 120 includes turbine portion 122 and compressor portion 124. The turbine portion 122 includes a turbine housing 126 and the compressor portion 124 includes a compressor housing 128. The turbine housing 126 and compressor 124 are coupled by a shaft housing (not shown). The turbocharger 120 further includes a wastegate controller 130 configured to enable a flow of exhaust through a wastegate passage (not shown). The turbine housing 126 includes an exhaust inlet 132 configured to receive exhaust flow 24 from the exhaust manifold 22. The exhaust gas flow 24 through a turbine volute within housing 126 drives rotation of the turbine wheel 27. The turbine housing 126 also includes an exhaust outlet (not shown) which directs exhaust gas flow 24 from the turbine volute to catalytic converter 50.

The turbine wheel 27 within turbine housing 126 is coupled by a shaft (not shown) to a compressor wheel 35 in compressor housing 128. The compressor housing 128 includes air inlet 134, compressor volute 136, compressor outlet 138, and EGR inlet port 140. The air inlet 134 receives fresh air 72 and directs an air flow to the compressor wheel 35 within compressor volute 136. As depicted, the EGR inlet port 140 is in fluid communication with the air inlet 134, thereby enabling a combination of exhaust gas 24 with fresh air 72. In an exemplary embodiment, the EGR inlet port 140 receives the exhaust gas 24 from EGR inlet conduit 84 and EGR valve 85, wherein the EGR valve 85 receives the exhaust gas from EGR supply conduit 82 coupled to EGR supply port 108, shown in FIG. 2. In another embodiment, the EGR inlet port 140 receives the exhaust gas 24 from EGR conduit 86, which is coupled to exhaust conduit 34, and directs the exhaust gas 24 through the EGR valve 85 through EGR inlet conduit 84 to EGR inlet port 140. In the embodiment of FIG. 3, the arrangement of EGR inlet port 140 in fluid communication with and on air inlet 134 forms a combined flow of EGR exhaust gas and fresh air 72 to the compressor wheel. In an aspect, the EGR inlet port 140 is positioned upstream of the compressor wheel, which supplies the EGR flow at a higher pressure relative to the gas flow downstream of the compressor wheel. Accordingly, the compressor wheel 35 compresses and pressurizes the fresh 72 air and EGR exhaust gas mixture, thereby directing the intake charge 20 mixture through the compressor outlet 138. The compressed air and EGR gas mixture is then directed to the engine 10 by intake system 12. As discussed herein, the terms upstream and downstream describe position of components or parts of the turbocharger or EGR system in relation to the flow of gas, air, exhaust, or a combination thereof, through the system. Further, in an embodiment, a pressure of the fluid flow upstream of a turbine wheel 27 is greater than a fluid flow pressure downstream of the turbine wheel 27. Moreover, a pressure of the fluid flow upstream of a compressor wheel 35 is less than a fluid flow pressure downstream of the compressor wheel. The integration of EGR inlet port 140 with compressor housing 128 provides manufacturing and design flexibility via simplified packaging for a variety of internal combustion engines.

Figure 4:
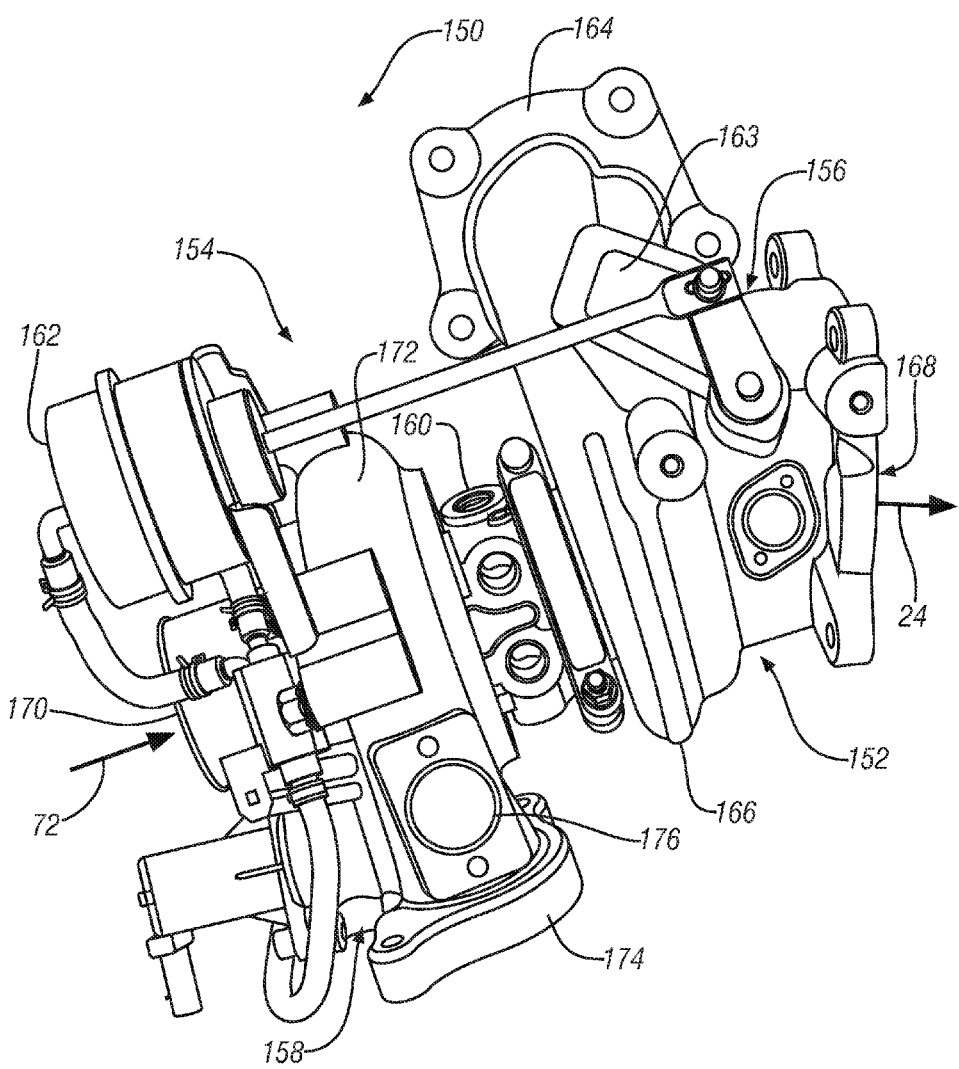
FIG. 4 is a perspective view of another embodiment of a turbocharger.

Referring now to FIGS. 1 and 4, in one embodiment, an exemplary turbocharger 150 includes turbine portion 152 and compressor portion 154. The turbine portion 152 includes a turbine housing 156 while compressor portion 154 includes a compressor housing 158. Shaft housing 160 couples turbine housing 156 and compressor housing 158. The turbocharger 150 includes a wastegate controller 162 configured to control a flow of exhaust through a wastegate passage 163. The turbine housing 156 includes an exhaust inlet 164 configured to receive exhaust flow 24 from the exhaust manifold 22. The exhaust gas flow 24 drives rotation of the turbine wheel 27, located in a turbine volute 166 of housing 156. The turbine housing 156 also includes an exhaust outlet 168 which directs exhaust gas flow 24 from the turbine volute 166 to catalytic converter 50, exhaust conduit 34 or other exhaust treatment devices.

The turbine wheel 27 within turbine housing 156 is coupled by a shaft (not shown) to a compressor wheel 35 in compressor housing 158. The compressor housing 158 includes air inlet 170, compressor volute 172, compressor outlet 174, and EGR inlet port 176. As depicted, the air inlet 170 receives fresh air 72 and directs an air flow to the compressor wheel 27 within compressor volute 172. Compressed fresh air 72 is directed from the compressor volute 172 to compressor outlet 174. The EGR inlet port 176 is in fluid communication with the compressor outlet 174. In an exemplary embodiment, the EGR inlet port 176 receives the exhaust gas 24 from EGR inlet conduit 84 of the EGR system 80, wherein the EGR inlet conduit 84 receives the exhaust gas from EGR supply conduit 82 coupled to EGR supply port 108, shown in FIG. 2. In another exemplary embodiment, the EGR inlet port 176 receives the exhaust gas 24 from EGR inlet conduit 84 of the EGR system 80, wherein the EGR inlet conduit 84 receives the exhaust gas from EGR supply conduit 82 coupled to EGR supply port 114. In yet another embodiment, the EGR inlet port 176 receives the exhaust gas 24 from EGR conduit 86, which is coupled to exhaust conduit 34, and directs the exhaust gas 24 through the EGR valve 85 through EGR inlet conduit 84 to EGR inlet port 176.

As depicted in FIGS. 1 and 4, a combined flow of exhaust gas 24 from EGR inlet port 176 and fresh air 72 from compressor volute 172 are directed to the engine intake manifold 18. In addition, the EGR inlet port 176 is positioned downstream of the compressor wheel 35 and supplies the EGR flow at a pressure that is greater than a pressure of air flow upstream of the compressor wheel. Accordingly, the compressor wheel 35 compresses and pressurizes the fresh air which is then directed to compressor outlet 174 where the compressed air is mixed with exhaust gas 24 to form the intake charge 20 which is directed from the compressor outlet 174 to the engine 10 via intake system 12. The integration of EGR inlet port 176 with compressor housing 158 provides manufacturing and design flexibility via simplified packaging for a variety of internal combustion engines.

With reference to FIGS. 1, 3 and 4, in exemplary embodiments, the EGR inlet conduit 84 (FIG. 1) is in fluid communication with an EGR inlet port (140, 176) coupled to or located on the compressor housing 36, 128 and 158. A selected amount of recirculated exhaust flow 81 is routed from an exhaust supply, such as turbine housing 28 or exhaust conduit 34, through EGR valve 85 to inlet conduit 84. The recirculated exhaust flow 81 is injected into the compressor housing 36, thereby reducing the complexity of the EGR plumbing and conduits (82, 84, 85). Therefore, the EGR inlet port (140, 176) and inlet conduit 84 provide improved and simplified packaging for increasingly complex engines by providing EGR integration with turbocharger (120, 150). In addition, the configuration provides flexibility for a variety of engines and applications. By integrating the EGR inlet port (140, 176) with the compressor housing (128, 158), the embodiments provide a simplified system to reduce costs and reduce production times. Moreover, the embodiments provide improved engine efficiency by enabling a supply of exhaust gas 24 from the turbocharger (120, 150) upstream of closely coupled catalytic converter 50.

The exemplary embodiments of EGR supply ports and EGR inlet ports may be used in combination or with alternative arrangements for air intake systems, turbochargers, superchargers or exhaust systems. For example, the EGR supply port 108 (FIG. 2) may supply a recirculated exhaust gas flow that is directed to EGR exhaust inlet port 140 (FIG. 3) and/or EGR exhaust inlet port 176 (FIG. 4). In an embodiment that includes EGR supply port 108 and EGR exhaust inlet port 140, the relative low pressure exhaust from port 108 is directed to a relative low pressure air flow at inlet port 140. In another embodiment that includes EGR supply port 108 and EGR exhaust inlet port 176, the exhaust from port 108 is directed to a relative high pressure compressed air flow at inlet port 176. In yet another embodiment that includes EGR supply port 114 and EGR exhaust inlet port 176, the relative high pressure exhaust from port 114 is directed to a relative high pressure compressed air flow at inlet port 176. In an embodiment that includes EGR supply port 114 and EGR exhaust inlet port 140, the relative high pressure exhaust from port 114 is directed to a relative low pressure air flow at inlet port 140. In embodiments, the turbine portion 152 and compressor portion 154 may be separated, wherein the compressor portion 154 is driven by an electric motor. Accordingly, the turbine portion 152 and compressor portion 154 are operationally coupled by such non-limiting examples as a mechanical device, such as a shaft, or electrical conductors.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the present application.

What is claimed is:

1. A turbocharger, comprising:
a turbine, comprising:
  a turbine wheel attached to a shaft, the turbine wheel rotatably disposed in a turbine housing;
  a turbine inlet located on the turbine housing and in fluid communication with a turbine volute that houses the turbine wheel, the turbine inlet configured to direct a first exhaust gas flow from an engine to the turbine wheel;
  a turbine outlet located on the turbine housing, the turbine outlet in fluid communication with the turbine volute;
  a first exhaust gas recirculation supply port located on and in fluid communication with the turbine outlet, the exhaust gas recirculation supply port configured to direct a portion of the first exhaust gas flow that has passed through the turbine wheel to an exhaust gas recirculation supply conduit;
  a second exhaust gas recirculation supply port coupled to receive the first exhaust gas flow from the engine; and,
  a compressor comprising a compressor inlet, a compressor outlet and a compressor volute therebetween, the compressor further having a compressor wheel coupled to the shaft, wherein the exhaust gas recirculation supply conduit is fluidly coupled to the compressor between the compressor inlet and the compressor wheel.

2. The turbocharger of claim 1, wherein the turbine outlet directs a portion of the first exhaust gas flow from the turbine volute to a catalytic converter mounted to the turbine outlet.

3. The turbocharger of claim 1, wherein the first exhaust gas recirculation supply port and second gas recirculation supply port directs the portion of the first exhaust gas flow through exhaust gas recirculation conduits to an exhaust gas recirculation inlet port on the compressor housing.

4. The turbocharger of claim 3, wherein the exhaust gas recirculation inlet port is located on and in fluid communication with an air inlet of the compressor housing, thereby mixing a second exhaust flow from the EGR conduits with a fresh air flow.

5. The turbocharger of claim 3, wherein the exhaust gas recirculation conduits comprise an exhaust gas recirculation valve, an exhaust gas recirculation supply conduit, and an exhaust gas recirculation inlet conduit.

6. An internal combustion engine system, comprising:
an engine having an exhaust manifold;
a turbocharger comprising a turbine and a compressor, the turbine comprising a turbine wheel rotatably disposed in a turbine housing, a turbine inlet located on the turbine housing and in fluid communication with a turbine volute that houses the turbine wheel, the turbine inlet being fluidly coupled to the exhaust manifold, a turbine outlet located on the turbine housing, the turbine outlet in fluid communication with the turbine volute, a first exhaust gas recirculation supply port located on the turbine outlet, a second exhaust gas recirculation supply port fluidly coupled to receive exhaust gas from between the exhaust manifold and the turbine inlet, the compressor having a compressor inlet, a compressor outlet and a compressor wheel therebetween;
a catalytic converter fluidly coupled to the turbine outlet downstream from the first exhaust gas recirculation supply port; and
an EGR system in fluid communication with the turbocharger, the exhaust gas recirculation system comprising an exhaust gas recirculation supply conduit in fluid communication with the first exhaust gas recirculation supply port and second exhaust gas recirculation supply port, the exhaust gas recirculation supply conduit being configured to direct a portion of exhaust gas flow that has passed through the turbine wheel to be mixed with a fresh air flow upstream from the compressor wheel.

7. The system of claim 6, wherein a compressor wheel is rotatably disposed in a compressor housing and wherein the compressor wheel is coupled to the turbine wheel by a shaft.

8. The system of claim 7, wherein the turbine outlet receives an exhaust gas flow from the turbine volute and the first exhaust gas recirculation supply port directs a portion of the exhaust gas flow through the exhaust gas recirculation conduit to an exhaust gas recirculation inlet port on the compressor housing.

9. The system of claim 8, wherein the exhaust gas recirculation inlet port is directly coupled to an air inlet of the compressor housing.

10. The system of claim 8, wherein the exhaust gas recirculation inlet port receives a selected amount of exhaust gas flow from an exhaust gas recirculation valve in line with the exhaust gas recirculation conduit.

11. The system of claim 7, wherein the compressor housing is operationally coupled to the turbine housing.

* * * * *